United States Patent [19]

Leftheris et al.

[11] 4,129,028
[45] Dec. 12, 1978

[54] METHOD AND APPARATUS FOR WORKING A HOLE

[75] Inventors: Basil P. Leftheris; Joseph H. Mainhardt; Walter Schwenk, all of Huntington, N.Y.

[73] Assignee: Grumman Aerospace Corporation, Bethpage, N.Y.

[21] Appl. No.: 862,204

[22] Filed: Dec. 19, 1977

[51] Int. Cl.² .............................................. B21J 7/30
[52] U.S. Cl. .................................... 72/430; 29/243.54
[58] Field of Search ................... 72/56, 370, 393, 429, 72/DIG. 20, 430; 29/243.52, 243.53, 243.54, 421 M, 525, 446

[56] References Cited

U.S. PATENT DOCUMENTS

| | | | |
|---|---|---|---|
| 2,806,328 | 9/1957 | Bradfield | 72/DIG. 20 |
| 3,201,967 | 8/1965 | Balamuth | 72/56 |
| 3,224,086 | 12/1965 | Balamuth | 29/243.54 |
| 3,609,851 | 10/1971 | McMaster | 29/243.54 |
| 3,646,791 | 3/1972 | Leftheris | 72/56 |
| 3,731,370 | 5/1973 | Leftheris | 72/56 |
| 3,824,824 | 7/1974 | Leftheris | 29/243.54 |
| 3,892,121 | 7/1975 | Champoux | 29/243.52 |
| 3,945,109 | 3/1976 | Leftheris | 29/525 |

Primary Examiner—C.W. Lanham
Assistant Examiner—Gene P. Crosby
Attorney, Agent, or Firm—Mellor A. Gill

[57] ABSTRACT

A method and apparatus therefor using the stress wave phenomenon for sizing and working a hole in a workpiece. A mandrel of the desired size, shape, and finish is "driven" into the hole by a stress wave to work the hole and impart thereto a desired shape, size, and finish. Electromagnetic means are used to generate the stress wave whose characteristics are such that it can be propagated through the mandrel and into the workpiece with a pulse energy level, rise rate, and duration sufficient to put the material in the walls of the hole into a condition of plastic flow so that a permanent deformation thereof conforming to the working area of the mandrel is achieved. A straight or a tapered hole can be worked or a straight hole can be converted into a tapered hole having the desired final shape, size, and finish. In a further embodiment, the mandrel used in the method can be the fastener for which the hole has been drilled. If required, more than one stress wave pulse can be used to achieve the desired working of the hole.

11 Claims, 5 Drawing Figures

METHOD AND APPARATUS FOR WORKING A HOLE

BACKGROUND OF THE INVENTION

Field of the Invention

The present invention relates to the art of working a hole to a desired shape, size, and finish and, more particularly, to a method and apparatus therefor which utilizes the stress wave phenomenon in conjunction with a mandrel for the purpose.

SUMMARY OF THE INVENTION

In manufacturing operations for products such as aircraft where high standards of precision and performance are set, it is becoming an increasingly common practice to work the holes drilled in workpieces for the installation of fasteners. It is known that the cold working or coining of the material surrounding a hole sets up compressive residual stresses in the material that improves the fatigue life and greatly decreases the possibility of the propagation of cracks. It is also known that there is a need for improved means for making close-tolerance straight and tapered holes. Control of finish and dimensional characteristics such as taper or roundness has been particularly difficult.

In applications where high strength is required in a light-weight fastener of small size, the use of tapered interference fit fasteners is becoming common. Although the use of such fasteners has many advantages, with current techniques there is a cost penalty because of the added expense attendant not only for the drilling and reaming of a tapered hole to match the tapered fastener, but also for the inspection required to assure quality control. To achieve the benefits obtainable with these devices, the tapered fastener must have contact with about 75% of the surface area of the hole. In conventional operations, a hole is drilled and then reamed to size. After reaming, the current technique is to "blue-in" the reamed hole to determine if the required size has been achieved. Blueing is done by using prussian blue or a similar material on a tapered plug master gauge. The gauge is then rammed into the hole manually or is tapped in with a hammer. The gauge is then removed and inspected for surface indications in the blue coating that provide a visual indication of surface contact. If a 75% contact has not been achieved, the hole is worked further by reaming or ramming. Over-reaming, of course, enlarges the hole to the extent that special oversized fasteners have to be used.

In our invention, a roughly drilled hole is sized, shaped, and finished with a material which is "driven" by a stress wave generator. The mandrel which has the required hardness, finish, dimensions, and configuration is attached to the stress wave generator and the mandrel is inserted into the hole in contact with the walls thereof. A stress wave pulse of a predetermined rise rate, energy amplitude, and duration is then propagated through the mandrel into the walls of the hole to put the material therein into a state of plastic flow such that walls of the hole are permanently deformed into conformance with the surface of the mandrel in contact therewith. If required, a second and further pulses can be propagated through the mandrel to achieve the desired results.

With the means of our invention, we have been able to work a roughly drilled pilot hole to obtain inexpensively a close tolerance hole (to less than 0.001 inch) having a surface smoothness of less than 30μ inch rms. Because of the surface finish, less interference is needed with interference fit fasteners such that less force is required to drive that type of fastener either of the straight or tapered type. When sizing an already tapered hole, this invention serves to level the high spots left by the reaming operation rather than cutting away the spots so that there is less likelihood of the hole becoming oversized. Of course, the leveling of high spots will also increase the surface area in contact with the fastener and will thereby increase the efficiency of the connection.

OBJECTS OF THE INVENTION

It is a principal object of the invention to employ the stress wave phenomenon in apparatus used to work and finish holes in workpieces such that the many advantages derived from the use of stress waves can be realized on a production basis.

It is another object of the invention to employ a stress wave to energize a suitable mandrel to enable a rough-drilled hole to be readily and inexpensively worked into a close-tolerance hole of the required configuration and finish.

It is a further object of the invention to provide a tool that will produce a finished, close-tolerance hole from a roughly drilled pilot hole rapidly and at low cost and which tool is readily adapted for handheld operation.

It is yet another object of the invention to provide a tool that will produce quickly and inexpensively a close-tolerance tapered hole from a roughly drilled straight pilot hole.

It is a yet further object of the invention to provide apparatus that can produce a finely finished hole to close tolerance repetitively such that inspection time and costs are substantially reduced.

Another object of the invention is to provide apparatus for use with tapered fasteners which enables the fastener itself to be employed as a mandrel such that, in the process of being installed in a straight or tapered hole, the fastener shapes, sizes, and finishes to the required tolerances the hole in which it is fitted.

DESCRIPTION OF THE PRIOR ART

Metal working techniques in which a mandrel is driven into a hole to size or finish it or to coin the hole walls for strength or fatigue considerations are, of course, well-known in the art. For holes that pass completely through a workpiece, a common technique is the "ballizing" process in which a hardened steel ball is employed as a mandrel that is forced through the hole to size and finish it.

The use of stress waves in manufacturing and metalworking operations is also known. That the employment of the phenomenon in blind riveting apparatus, in a blind riveting method, for deforming metal, and for driving interference fit fasteners is also known is evidenced by U.S. Pat. Nos. 3,646,791; 3,731,370; 3,824,824; and 3,945,109, respectfully, issued to the same assignee as is of record in the instant application. In the first two patents listed which relate to blind riveting, the stress wave is passed through the fastener being installed to impart a momentary state of plasticity to the tubular body of the fastener itself. In the subject invention, the material surrounding the hole in the workpiece is put into a momentary state of plasticity, not the mandrel nor the fastener if such is being used as a mandrel.

In the invention disclosed in the third listed patent, the entire workpiece is set into a condition of high plastic flow, not a limited area of the workpiece surrounding a hole therein as taught in the instant invention such that a mandrel attached to the stress wave generator can work the hole walls to thereby impart a desired size, shape, and finish thereto. The last of the listed patents discloses the use of a stress wave having an amplitude and duration that will induce a stress in an interference-fit fastener that is less than the yield stress thereof such that the fastener is "driven" into a hole. Neither the fastener is set into a condition of high plastic flow nor as is the case in the present invention are the walls of the hole into which it is being installed. The prior art disclosures of the use of the stress wave phenomenon teach, therefore, either the placing of the entire workpiece or the fastener being installed therein into a momentary state of plasticity or the setting up in an interference-fit fastener a stress below the yield stress thereof, and it thus does not teach the propagating of a stress wave through a mandrel (or a fastener being used as a mandrel) into the material in the walls of a hole to permanently deform them into a predetermined size, shape, and finish controlled by the mandrel. There thus does not appear to have been an appreciation in the prior art that the passing of a stress wave through a suitable mandrel inserted in a hole would make the walls thereof flow plastically to conform permanently to the physical configuration of the mandrel so as to thereby work a hole to close tolerances rapidly, inexpensively, and with a minimum requirement for inspection, even for tapered holes to be used for interference-fit tapered fasteners.

DESCRIPTION OF THE DRAWINGS

For the purpose of illustrating the invention, there are shown in the drawings the forms which are presently preferred, it should be understood, however, that the invention is not necessarily limited to the precise arrangements and instrumentalities here shown.

DESCRIPTION OF THE PREFERRED EMBODIMENTS

Figure 1:
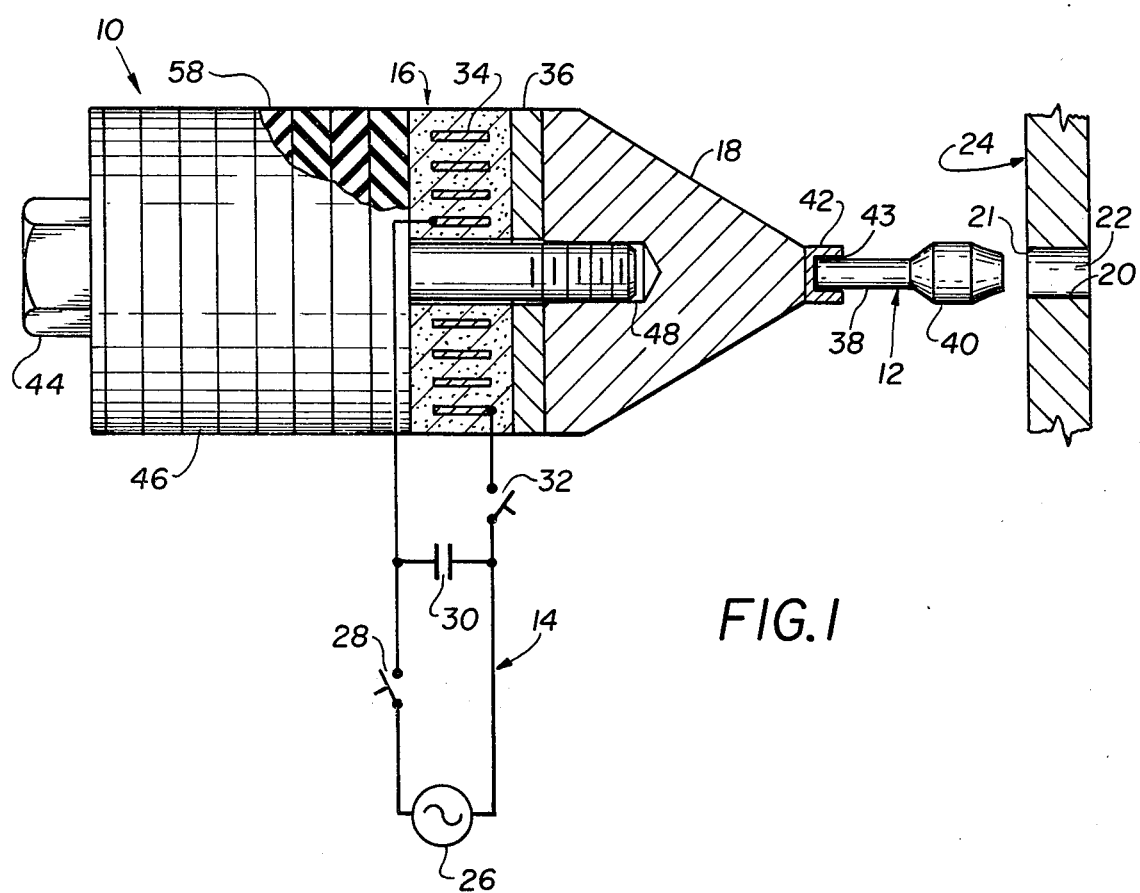
FIG. 1 is a schematic side elevational view partially in section of a stress wave apparatus and mandrel of the invention showing a workpiece in fragmentary cross section.

Referring now to the drawings, FIG. 1 illustrates a stress wave tool 10 and a mandrel 12 used in the invention. As depicted in FIG. 1, the apparatus comprises a power supply 14 connected to the stress wave tool 10 which has a stress wave generator 16 and a stress wave focusing means or amplifier 18 for producing a stress wave or pulse which is transmitted by mandrel 12 into the walls 20 of a hole 22 in a workpiece 24 to set up plastic flow therein such that desired characteristics can be imparted to the hole by the mandrel.

The power supply 14 comprises an energy source 26 and switch means 28 connected in parallel to a capacitor bank 30 which, in turn, is connected by switch means 32 to the stress wave generator 16. Stress wave generator 16 comprises a pancake coil 34 and an aluminum or hardened copper driver 36 situated in a side by side relationship. The mandrel 12 is made of hardened tool steel and may have a body or shank portion 38 and a nose 40 having a predetermined shape, size, and surface finish.

In operation, the operator inserts the nose 40 of the mandrel 12 into hole 22 of the workpiece 24 in full contact with the edge area 21 of the walls 20 thereof and closes switch 28. Closing switch 28 causes the capacitor bank 30 to be charged by energy source 26. After the capacitor bank is charged, the switch 28 is opened and switch 32 is closed, triggering the tool 10. It will be appreciated that switches 28 and 32 can be interconnected by known means such that the operator will merely close switch 28, causing the capacitor bank to be charged (usually a matter of about 2 to 10 seconds), and switch 28 will close and switch 32 will open automatically. Closing switch 32 allows a high amperage current pulse of short duration to flow through the pancake coil 34, the duration of the current pulse being in the order of microseconds. This current sets up a high intensity magnetic field around the coil 34 and this field intersects driver 36 which acts as a one-turn secondary winding of a transformer to thereby induce a current therein. The induced current flowing through the driver sets up around it a high-intensity magnetic field. The electromagnetic repulsion established by the interaction of the two high-intensity magnetic fields generates a stress wave in the driver which is propagated through the amplifier 18 and tip 42 and thence through mandrel 12 and nose 40 thereof into the walls 20 of the hole 22 of the workpiece 24. The intensity of this stress wave or pulse is such that, when it propagates into the workpiece, the material around the hole is rendered plastic and the relatively hard mandrel is advanced into the hole. The greater portion of the stress pulse is transformed to energy of plastic deformation and the pulse length is selected to overcome internal delay such that plastic flow is initiated in the walls of the workpiece hole. If the thickness of the workpiece is less than the length of the pulse, the walls of the entire hole will yield and a single pulse will be sufficient to advance the nose of the mandrel through the workpiece such that the mandrel imparts the desired size, shape, and surface finish to the hole as it passes through it. For thicker workpieces, two or more stress pulses may be required to complete the working of a hole therein. A detailed description of the stress wave phenomenon and the considerations involved in the design of apparatus suitable for utilizing the same can be found in the aforementioned U.S. Pat. Nos. 3,824,824 and 3,945,109, to B. P. Leftheris, which are incorporated herein by reference.

The stress wave tool 10 can be fixed in a frame and the workpiece can be fed thereto or it can be handheld and used portably by an operator. The only structural modification required for the intended mode of use is that in the portable machine a bolt 44 passes through the shock absorber 46 and the other components of the tool and is threaded into a hole 48 in the base of the amplifier 18 to hold the tool components in a tight assembled relationship; when used in a frame (not shown), a stud (not shown) on a frame member extends through the shock absorber and into the amplifier in order to keep the apparatus centered.

Figure 2:
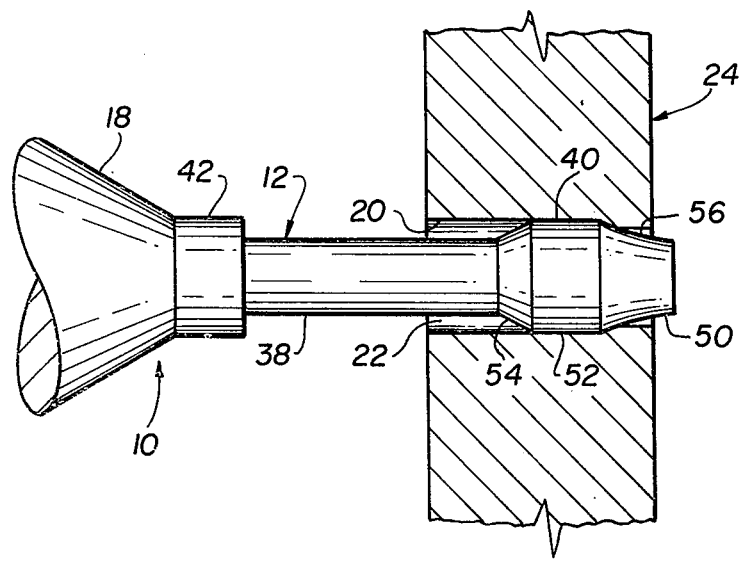
FIG. 2 is fragmentary side elevation of a stress wave tool and a mandrel for working a straight-walled hole in a workpiece.

In one embodiment, the capacitor bank 30 was of a low inductance and fed a high electrical current to the coil 34. With the coil connected and coupled electromagnetically to driver 36, which was made of aluminum, the system had an operating frequency of 4–10 KC/sec. The coil included 18 turns of rectangularly shaped ½ by 0.080 inch copper and was potted in polyurethane having an elasticity equivalent to 60-durometer rubber. Coil dimensions were 1½-inch thick by 6 inches in diameter with a one-inch diameter circular hole through the center. The driver was made of 6061-T4 aluminum, ¼-inch thick by 6 inches in diameter with a 1-inch diameter circular hole through the center. The amplifier or focusing means 18 was constructed of 4340 hardened steel and had a cylindrical ½-inch by 6-inch diameter base section leading into a truncated cone 6-inches long and having a ¾-inch diameter by ½-inch long tip 42 to which the mandrel 12 was suitably attached as by means of a recess 43. The mandrel was constructed of hardened tool steel and had a shank 38 (see FIG. 2) and a nose 40 having a pilot section 50. Nose 40 had a substantially cylindrical portion 52 characterized by a shape, size, and finish which it was desired to impart to the walls of the hole being worked. Ramps 54 and 56 were provided as fillets between portion 52 and the shank and pilot section, respectively. The shock absorber 46 comprised a series of rubber pads 58 having a 1-inch diameter circular hole through their centers. The various components of the tool 10 were retained in their proper tight assembled relationship by 1-inch diameter centering bolt 44 which passed through the circular center holes and was threaded into 1-inch diameter by one-inch deep hole 48 in the base of focusing means 18.

It will be recognized that the mandrels used in the method of this invention can be of a design suitable to meet the requirements of the hole being worked. The mandrel embodied in FIGS. 1 and 2 which has been described above is suitable for coining and sizing straight-walled holes through a workpiece. When using that mandrel, the original or pilot hole should be drilled approximately 0.005 to 0.02 inch smaller than the desired final hole size.

Figure 3:
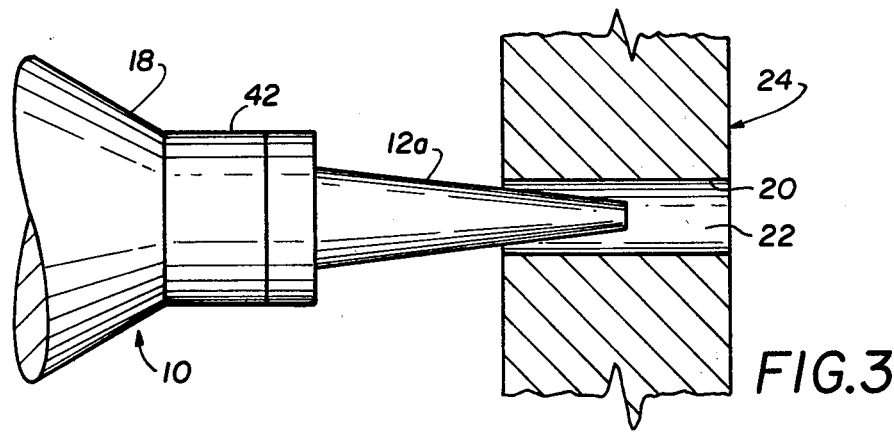
FIG. 3 is a fragmentary side elevation of a stress wave tool and a mandrel for tapering and working a straight-walled hole.
Figure 4:
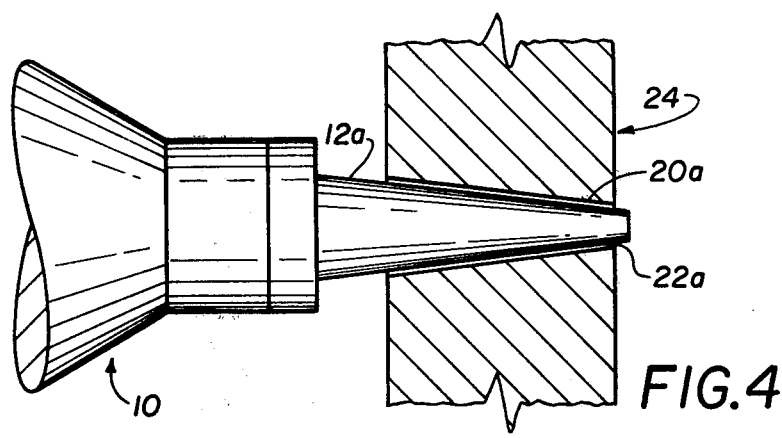
FIG. 4 is a fragmentary side elevation of a stress wave tool and a mandrel for working a tapered hole.

It it is desired to taper a straight-walled hole, a mandrel having the desired finished size and taper can be used. As indicated in FIG. 3, no changes are necessary in the stress wave tool 10 itself but the nose of mandrel 12a is tapered, finished, and sized as required to impart the desired characteristics to the finished hole. It will be appreciated that the capacitor charge will be gauged to produce the necessary energy input into the workpiece to effect the required working of the hole and to accommodate other physical characteristics of the workpiece. If conditions require that an already tapered hole be coined, sized, or finished (see FIG. 4), the tapered-nose mandrel 12a is suitable for use. In this situation, the hole 22a would first be drilled and the walls 20a then reamed and plug gauged roughly to size prior to its being worked using the method of this invention.

Figure 5:
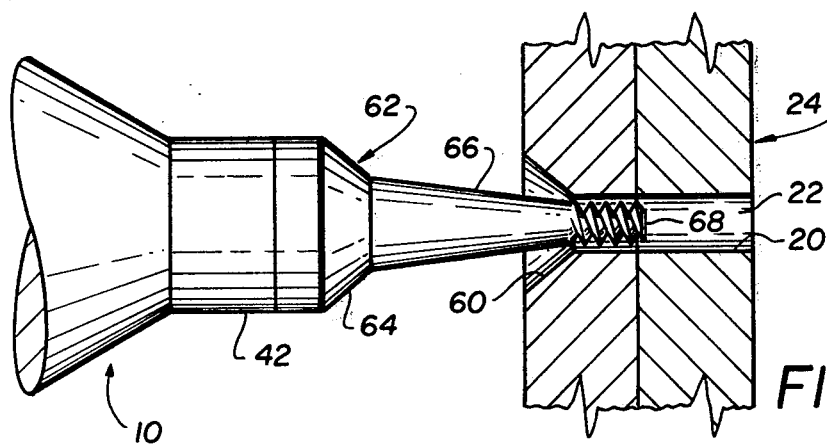
FIG. 5 is a fragmentary side elevation of a stress wave tool and a tapered fastener used as a mandrel in accordance with the invention.

In a further embodiment of the invention, the fastener to be installed can be used as the mandrel to prepare the hole in which it is to be fitted. In this embodiment, the pilot hole 22 in the workpiece 24 can be a roughly drilled straight-walled hole. As shown in FIG. 5, the pilot hole can be provided with a countersink 60 or the like if the design of the fastener to be installed so dictates. In one embodiment, the fastener 62 to be installed in a 7075-T6 or a 2024-T3 aluminum workpiece was a steel Taper-Lok (Standard Pressed Steel Co., Jenkintown, Pa. 19046) ¼-inch by ¾-inch long interference-fit bolt. The bolt 62 had a flush head 64, tapered shank 66, and a threaded end 68. In operation, bolt 62 was inserted by hand as far as it would go into pilot hole 22 and the tip 42 of the stress wave tool 10 was brought into close contact with the head of the bolt. A stress wave was then propagated through the bolt which then acted as a mandrel to taper, size, and finish hole 22.

Although shown and described in what is believed to be the most practical and preferred embodiments, it is apparent that departures from the specific method and apparatus described will suggest themselves to those skilled in the art and may be made without departing from the spirit and scope of the invention. We, therefore, do not wish to restrict ourselves to the particular constructions illustrated and described, but desire to avail ourselves of all modifications that may fall within the scope of the appended claims.

We claim:

1. Apparatus for sizing, working, and finishing a hole in an article comprising:

a mandrel at least a portion of which has a surface having physical characteristics which will impart a desired final size, shape, and finish to said hole;

tool means for maintaining said mandrel surface in contact with at least the end portion of the walls of said hole;

stress wave generating means for producing a stress wave pulse in response to a high-amperage, short duration electrical impulse;

focusing means for propagating said pulse through said tool and said mandrel into the walls of said hole, said pulse having a rise time, intensity, and duration sufficient to set the material in said hole walls into a condition of plastic flow whereby said physical characteristics of said mandrel surfaces are imparted to said hole; and an energy source for supplying said electrical impulse to said stress wave generating means.

2. A method for sizing, working, and finishing a hole in an article comprising the steps of:

placing a mandrel into contact with at least the end portion of the walls of said hole, said mandrel having a working surface which has physical characteristics that will impart to said hole a desired final size, shape, and finish;

generating a stress wave pulse having a rise time, intensity, and duration sufficient to put the material in said hole walls into a condition of plastic flow; and passing said pulse through said mandrel and into said article such that said plastic flow causes said material in said hole walls to conform to said final size, shape, and finish imparted thereto by said mandrel surface.

3. The method of claim 2 wherein at least two stress wave pulses are passed through the mandrel into the article.

4. The method of claim 2 wherein the hole in the article is a roughly drilled hole approximately 0.005 to 0.02 inch smaller than the intended finished size.

5. The method of claim 2 wherein the hole is straight and of a constant diameter and wherein the physical characteristics of the mandrel are such that the finished hole is straight and of a constant diameter.

6. The method of claim 2 wherein the hole is straight and of a constant diameter and wherein the physical characteristics of the mandrel are such that the finished hole is tapered.

7. The method of claim 6 wherein the hole is tapered.

8. The method of claim 2 wherein the hole passes completely through the article.

9. The method of claim 2 wherein the mandrel is a fastener which is an interference fit with respect to the hole.

10. The method of claim 9 wherein the mandrel has a tapered shank.

11. The method of claim 9 wherein the mandrel is a fastener that is to be installed in the hole.

* * * * *